(12) United States Patent
Cameron (10) Patent No.: US 10,460,635 B1
(45) Date of Patent: *Oct. 29, 2019

(54) DEPLOYABLE TAPE ESTABLISHING VISIBILITY IN FIELD ENVIRONMENTS

(71) Applicant: Robert W Cameron, Bend, OR (US)

(72) Inventor: Robert W Cameron, Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,668

(22) Filed: Jan. 1, 2018

Related U.S. Application Data (63) Continuation-in-part of application No. 14/548,777, filed on Nov. 20, 2014, now Pat. No. 9,858,837.

(60) Provisional application No. 61/907,895, filed on Nov. 22, 2013.

(51) Int. Cl.
*G09F 17/00* (2006.01)
*G02B 5/12* (2006.01)

(52) U.S. Cl.
CPC ............... *G09F 17/00* (2013.01); *G02B 5/12* (2013.01); *G09F 2017/0083* (2013.01)

(58) Field of Classification Search
CPC .... G09F 17/00; G09F 2017/0083; G02B 5/12
USPC ...... 116/28 R, 173–175, 200, 209, 222–225; 40/427, 440, 479, 588–592, 603; 119/770; D30/153; 441/80; 416/11, 176
See application file for complete search history.

(56) References Cited

U.S. PATENT DOCUMENTS

| | | | | |
|---|---|---|---|---|
| 293,850 | A * | 2/1884 | Carly | G09F 7/22 40/479 |
| 296,705 | A * | 4/1884 | Novy et al. | B65D 59/04 229/90 |
| 925,907 | A * | 6/1909 | Heim | G09F 7/22 40/479 |
| 983,684 | A * | 2/1911 | Clapp | G09F 7/22 40/479 |
| 1,530,343 | A * | 3/1925 | Bayer | A01K 85/12 43/42.16 |
| 1,821,021 | A * | 9/1931 | Moise | G09F 19/00 40/440 |
| 2,117,501 | A * | 5/1938 | Raymond | B44C 5/00 160/332 |
| 2,898,704 | A * | 8/1959 | Sattler | A63H 5/00 116/28 R |
| 2,911,746 | A * | 11/1959 | Frey | G09F 17/00 40/604 |
| 2,948,257 | A * | 8/1960 | Levey | B60Q 7/00 116/63 P |

(Continued)

FOREIGN PATENT DOCUMENTS

ES  2020452 A6 * 8/1991

*Primary Examiner* — Justin Seo
*Assistant Examiner* — Tania C Courson
(74) *Attorney, Agent, or Firm* — Roy L. Anderson (57) ABSTRACT

A portable signaling device and method of use in which an elongated reflected strip with a broad and flat profile is held taut in air so that the elongated reflective strip freely twists and rotates along a line formed between a first and a second attachment point of the composite strip when a breeze contacts the broad and flat profile to create a visual signaling display as a result of twisting and rotation of the elongated reflective strip in which the elongated reflected strip is twisted at least once through one hundred and eighty degrees so that a first planar surface and a second planar surface of the elongate reflected strip are visible from a single vantage point.

10 Claims, 11 Drawing Sheets

(56) References Cited

U.S. PATENT DOCUMENTS

| | | | | |
|---|---|---|---|---|
| 2,967,372 A * | 1/1961 | Pass | A01K 91/06 | 416/176 |
| 2,998,799 A * | 9/1961 | Placek | B60K 28/06 | 116/28 R |
| 3,158,132 A * | 11/1964 | Guthrie | G09F 17/00 | 116/173 |
| 3,292,319 A * | 12/1966 | McCarthy | A01M 29/06 | 116/22 A |
| 3,715,821 A * | 2/1973 | Hawes | G09F 21/04 | 116/173 |
| 3,964,189 A * | 6/1976 | Belokin, Jr. | G09F 19/02 | 40/414 |
| 4,087,990 A * | 5/1978 | Gillette | F16C 1/02 | 290/55 |
| 4,143,199 A * | 3/1979 | Bardon | A47H 23/05 | 428/369 |
| 4,144,833 A * | 3/1979 | Newman, Sr. | B60Q 7/005 | 116/173 |
| 4,178,706 A * | 12/1979 | Boyce | G09F 21/18 | 114/242 |
| 4,366,199 A * | 12/1982 | Grosjean | A41G 1/04 | 428/114 |
| 4,471,873 A * | 9/1984 | Thomas | B60Q 7/005 | 116/173 |
| 4,597,357 A * | 7/1986 | LeMessurier | A01M 29/08 | 116/22 A |
| 4,708,592 A * | 11/1987 | Krolick | F03D 3/00 | 290/55 |
| 4,796,553 A * | 1/1989 | Cogswell | G09F 17/00 | 116/173 |
| 4,832,571 A * | 5/1989 | Carrol | F03D 3/064 | 416/11 |
| 4,906,503 A * | 3/1990 | De La Cruz | G09F 7/18 | 116/173 |
| 4,923,216 A * | 5/1990 | Cedar | B32B 15/08 | 281/2 |
| 5,055,326 A * | 10/1991 | Whitington | B60R 13/00 | 428/122 |
| 5,130,169 A * | 7/1992 | DeJaynes | D04D 7/10 | 156/294 |
| 5,167,199 A * | 12/1992 | Rehbein | G09F 7/22 | 116/173 |
| 5,701,840 A * | 12/1997 | Cross | G09F 17/00 | 116/173 |
| 5,901,586 A * | 5/1999 | Hale | B64F 1/16 | 70/18 |
| 6,126,145 A * | 10/2000 | Mohr | E04H 17/1439 | 256/21 |
| 6,398,615 B1 * | 6/2002 | Wu | A63H 33/40 | 40/440 |
| 6,484,662 B1 * | 11/2002 | Perucca | B63C 9/20 | 116/209 |
| 6,672,243 B2 * | 1/2004 | Seymour | G09F 17/00 | 116/173 |
| D488,090 S * | 4/2004 | Hester | D11/174 | |
| D505,640 S * | 5/2005 | Star | D11/131 | |
| 7,395,776 B2 * | 7/2008 | Harruna | G09F 21/048 | 116/28 R |
| D581,824 S * | 12/2008 | Catner | D10/109.1 | |
| D623,766 S * | 9/2010 | Votolato | D25/48.5 | |
| 7,806,483 B2 * | 10/2010 | Schultz | B60D 1/58 | 298/8 T |
| 7,874,093 B2 * | 1/2011 | Rohrke | A01M 31/06 | 43/2 |
| 8,490,325 B2 * | 7/2013 | Gargiulo | A01M 29/34 | 416/501 |
| 9,731,567 B1 * | 8/2017 | Schultz | B60D 1/58 | |
| 9,972,227 B2 * | 5/2018 | Evans | G09F 19/12 | |
| 10,035,390 B1 * | 7/2018 | Schultz | B60D 1/58 | |
| 2001/0047603 A1 * | 12/2001 | Ross | G09F 15/0025 | 40/584 |
| 2003/0116076 A1 * | 6/2003 | Hoyos | B60Q 1/50 | 116/28 R |
| 2004/0060214 A1 * | 4/2004 | Hanley | G09F 7/22 | 40/479 |
| 2004/0098893 A1 * | 5/2004 | Bardeleben | G09F 21/04 | 40/479 |
| 2004/0200402 A1 * | 10/2004 | Brewer | G09F 17/00 | 116/174 |
| 2006/0010738 A1 * | 1/2006 | Roark | G09F 11/02 | 40/479 |
| 2006/0213421 A1 * | 9/2006 | Kaltenhauser | E01F 9/619 | 116/22 R |
| 2007/0137092 A1 * | 6/2007 | Butz | A01M 31/06 | 43/3 |
| 2009/0311446 A1 * | 12/2009 | DeMoor | D04D 7/06 | 428/4 |
| 2010/0101481 A1 * | 4/2010 | Delia | A01M 29/06 | 116/22 A |
| 2018/0342184 A1 * | 11/2018 | Magovern, III | G09F 21/12 | |

* cited by examiner

DEPLOYABLE TAPE ESTABLISHING VISIBILITY IN FIELD ENVIRONMENTS

CROSS REFERENCE TO RELATED APPLICATIONS

This application is a continuation-in-part application that claims priority from U.S. Ser. No. 14/548,777, filed Nov. 20, 2014, which is a non-provisional application which claims priority from U.S. Ser. No. 61/907,895, filed Nov. 22, 2013, the disclosures of both of which are specifically incorporated herein by reference in their entireties.

FIELD OF THE INVENTION

The present invention relates generally to devices used to establish visual contact at a distance and, more particularly, to an apparatus that employs a high visibility material that can be stored in a compact form for carrying-purposes and deployed to form an elongated visual display when needed.

BACKGROUND OF THE INVENTION

There are many cases where it is imperative to establish one-way visual contact in a field environment, in both emergency and -operational situations.

For example, it is known that individuals who are lost or stranded in unpopulated locations have need to increase their visibility to searchers especially to those who may be attempting to locate them. Aircraft are commonly used for search and rescue (SAR) operations, due to their obvious ability to view large areas from an altitude. However, it is also well known that the very distance and expanse of the view renders it difficult for personnel to spot an individual from an aircraft, the problem akin to finding a needle in a haystack. Consequently, a number of approaches have been adopted over the years to increase the visibility of an individual (or group of individuals) to searching aircraft, with varying degrees of success and also varying disadvantages.

One of the most basic is the use of a small mirror to reflect sunlight towards the aircraft. This approach is highly effective under optimal circumstances, such as when signaling an aircraft from a raft in the ocean under clear skies and bright sunlight. It is much less effective, however, under cloudy or rainy conditions or in wooded areas. Furthermore, it requires the vigilance and active participation of the individual, who may be sleeping or otherwise unaware as the aircraft passes over, and who may also be suffering from the effects of exhaustion, exposure and/or injuries that would impair the individual's alertness and ability to use the mirror. Moreover, a degree of skill is required to angle the mirror so as to direct the reflected sunlight towards the aircraft, which is all the more difficult when the aircraft can be glimpsed only briefly between trees or other cover. Yet another drawback of signaling mirrors is that they must be quite small (only a couple of inches on a side) in order to be sufficiently compact to be carried, which necessarily limits the size of the reflective surface that can be presented towards the observer.

Other "active" signals have also been used for many years, including various types of flairs and smokes. However, these signals have a very limited duration (from several seconds to a few minutes) and once expended can no longer be used. Moreover, their bulk and weight renders it impractical for an individual to carry more than one or two at most. Hence, their use has generally been limited to boats, rafts and other vessels/vehicles having a substantial carrying capacity.

Various passive signals and visibility enhancements have also been adopted, i.e. signal enhancements that do not require active operation by the individual or individuals being sought. Examples include arranging blocks or logs in a large "X" in a clearing. Although helpful, the use of natural materials (presenting a low contrast against their surroundings) and the steady nature of such displays mean that they are nevertheless hard to spot. Moreover, any significant fatigue or injury to the individual would render it difficult to mange such objects in an adequately large display.

The further disadvantage of most prior approaches is that (with the exception of flairs and the like) they cannot be seen at night. Radar equipped search aircraft are available; however, conventional approaches generally present either inadequate radar cross-sections or returns that are indistinguishable from their surroundings. Infrared (IR) search equipment is also available for night use; however, the IR signature of a person is virtually indistinguishable from that of a deer or many other large animals.

Yet another factor is that under some circumstances, particularly military operations, it is critical that the signal be visible only to "friendly" observers and not others. For example, it is preferable that the position of a pilot downed in hostile territory be visible only to allied recovery personnel and not to enemy forces. In other instances, advance or Special Forces personnel may wish to indicate a certain site, such as a beach approach or drop area, with a marker that is visible only for those for whom the signal was intended.

Accordingly, there exists a need for an apparatus that enables an individual to establish a visual display that can be effectively seen by observers under a wide range of conditions. Furthermore, there exists a need for an apparatus that is easily deployed by an individual even if fatigued or injured, and that does not require active intervention by the individual once deployed. Still further, there is a need for such an apparatus that can be used effectively during both night and day. Still further, there exists a need for such an apparatus that produces official display that can be seen at long distance. Still further, there exists a need for such an apparatus that is compact and lightweight so as to be highly portable by an individual. Still further, there exists a need for such an apparatus that can be arranged in various ways to provide a variety of signals to the observer or observers. Still further, there exists a need for such an apparatus that can be configured to produce a display that is visible only to desired observers and not to others.

SUMMARY OF THE INVENTION

The present invention is generally directed to a portable signaling device and method of its use in which an elongated reflected strip with a broad and flat profile is held taut in air so that the elongated reflective strip freely twists and rotates along a line formed between a first and a second attachment point of the composite strip when a breeze contacts the broad and flat profile to create a visual signaling display as a result of twisting and rotation of the elongated reflective strip in which the elongated reflected strip is twisted at least once through one hundred and eighty degrees so that a first planar surface and a second planar surface of the elongate reflected strip are visible from a single vantage point.

These and other features and advantages of the present invention will be more fully understood from a reading of the following detailed description with reference to the accompanying drawings.

BRIEF DESCRIPTION OF THE DRAWINGS

FIG. 17 illustrates a signaling kit useful for roadside emergencies which provides an emergency signal in accordance with the present invention while

DETAILED DESCRIPTION

The present invention describes a variety of devices that are compact, inexpensive and easy to use that provide easily recognizable visual signals which are suitable for use in a variety of situations related to safety and rescue situations where such signals can save lives.

Figures 1, 2, 3:
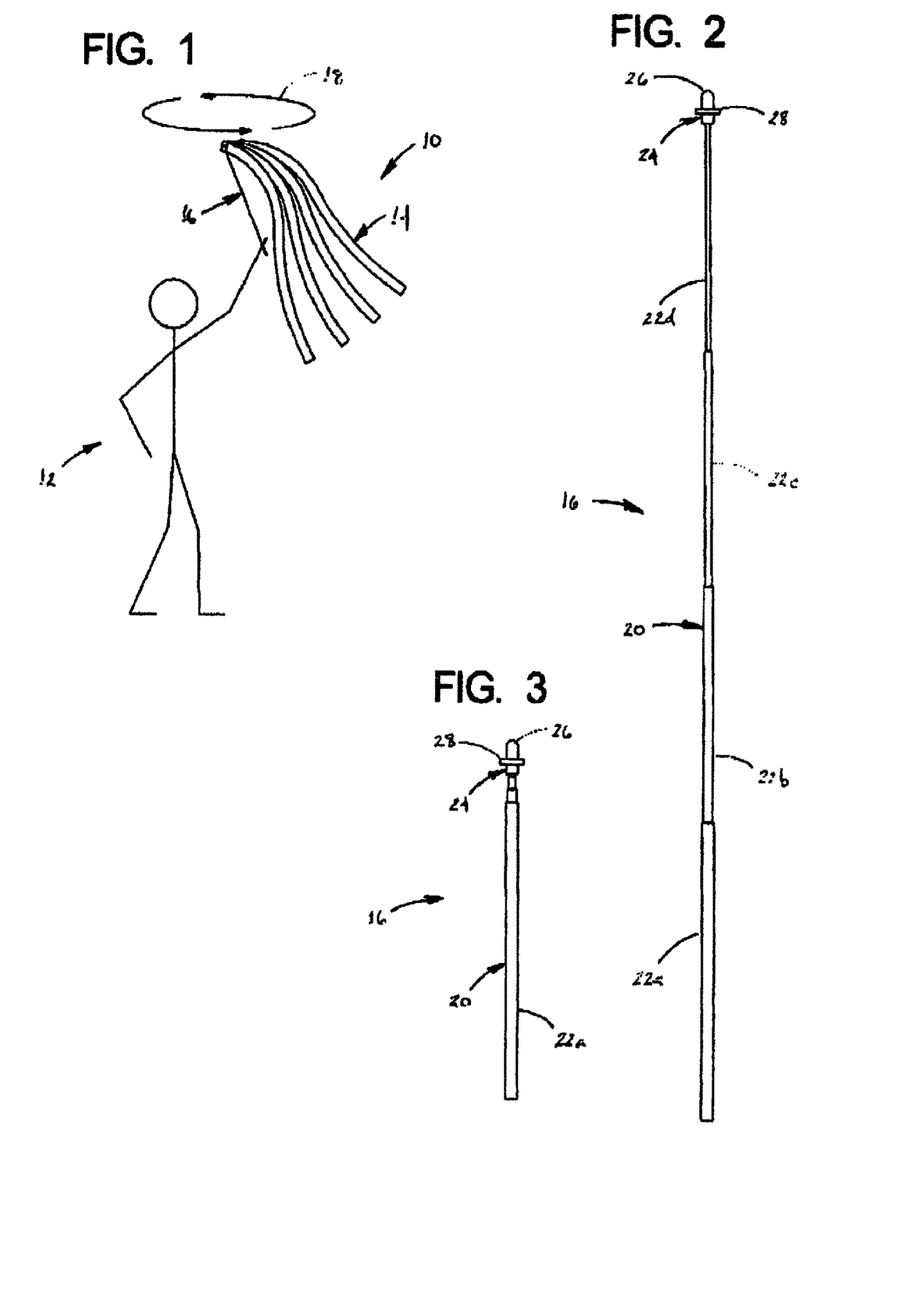
FIG. 1 is a perspective, environmental view showing an operator creating a distress display using one embodiment of an apparatus in accordance with the present invention.
FIG. 2 is an elevational view of the rod member of the signaling apparatus of FIG. 1, showing the rod member in its extended configuration.
FIG. 3 is a second elevational view of the rod member of FIG. 2, showing the rod member in its retracted configuration.

FIG. 1 shows a simple display apparatus 10 which can be held aloft by an individual 12. The display apparatus includes a multistrip reflector member 14 and a wand member 16. The wand member provides a handle by which the individual can elevate and swing or otherwise move the reflector member as indicated by arrows 18, so as to cause the strips of the reflector member to flutter and produce a reflection having a "flashing" effect; the apparatus can thus be used in an "active" fashion by the individual; however, it can also function on its own once deployed, as will be described below.

As illustrated in FIGS. 2-3, wand member 16 includes a collapsible rod 20 having a plurality of telescoping segments 22a-d. In this particular embodiment, each of the segments simply has a length of about 6 inches, allowing the assembly to collapse from an extended position of about 2 feet, as shown in FIG. 2, to a length of about 6 inches for ease of carrying, as shown in FIG. 3; it will be understood, however, that greater/fewer segments and greater/lesser lengths may also be used.

A cap member 24 is mounted at the distal end of the upper most end of the segment 22d of the rod. Cap member 24 includes a projection tip 26 having a domed end and generally cylindrical exterior bounded by an annular flange 28. As will be described in greater detail below, tip member 24 provides an attachment fitting for the reflector member 14, and is suitably formed of a rigid, somewhat resiliently flexible material such as molded plastic or rubber, for example.

Figure 4:
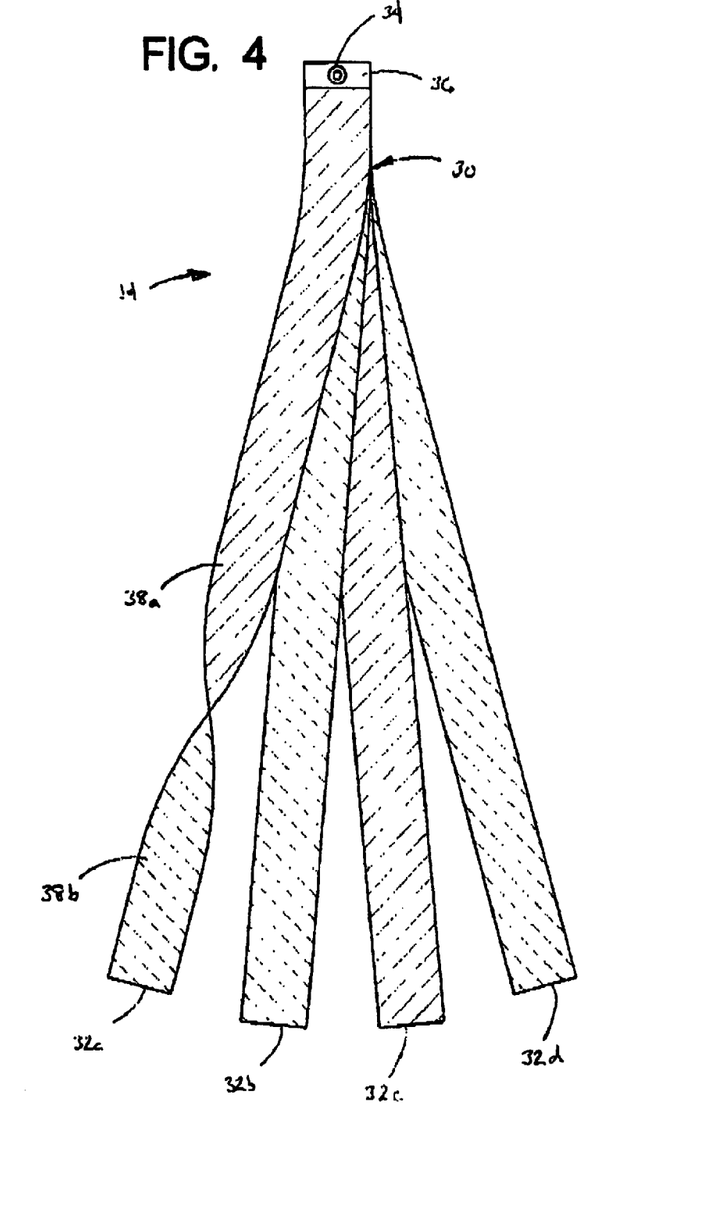
FIG. 4 is an elevational view of the multi-strip reflective member of the signaling apparatus of FIG. 1, showing the manner in which the opposite sides of the individual strips thereof have reflective characteristics.

As can be seen in FIG. 4, reflector member 14 includes a bundle 30 of strips 32a-d formed of thin, flexible reflective material. At one end the strips are free and at the other they are bound together by a grommet 34 that passes through the strips in an overlying layer of reinforcing menial 36. Strips 32a-d are suitably formed of metalized Mylar, preferably with contrasting, high visibility colors (e.g., red and silver) on the two sides 38a, 38b. Furthermore, as will be described in greater detail below, additional light and radar reflective materials may be included in the strips, as well as self-luminescent materials. The strips preferably have a length of about 4 feet, so as to have sufficient length to be visible from a distance but short enough to be held aloft and waved by an individual of average height.

The metalized Mylar strips are preferably attached to one another in such fashion so that the entire reflective member 14 can be rolled into a very compact, portable package. Similarly, the wand member 16 contracts to a very small lightweight package.

When needed, the wand and reflector members are extracted from a suitable carrying pouch or the like and the strips of the reflector member unrolled. Plastic tip member 24, with the resilient material of the tip member yielding slightly as this is done, creates a firm interference engagement between the wand and reflector members. Rod 20 of the wand member is then extended telescopically to its full length, so that the assembly can be held aloft and waved as is shown in FIG. 1. As this is done, the reflections, from the fluttering metalized Mylar strips, create a brilliant flickering or flashing effect that is visible at long distances, even under relatively hazy conditions. Moreover, the metalized Mylar provides a radar return that aids detection by radar equipped search aircraft or vessels.

In addition to being waved actively by the user, signaling assembly 10 may be secured to a tree, post, rock or the like to provide a signal which the person is passive, e.g., resting or asleep, particularly if there is sufficient breeze to cause motion of the strips and therefore create the "flashing" visual pattern.

FIGS. 5-10 illustrate one preferred embodiment of the invention in which there is a single elongate reflective strip, rather than a plurality of strips, joined together at one-end as shown in FIGS. 1-4. The increased length of the single strip is such that it cannot be easily held aloft and waved by an individual in a manner previously described; however, the assembly provides additional advantages that will be described below.

Figures 5, 6:
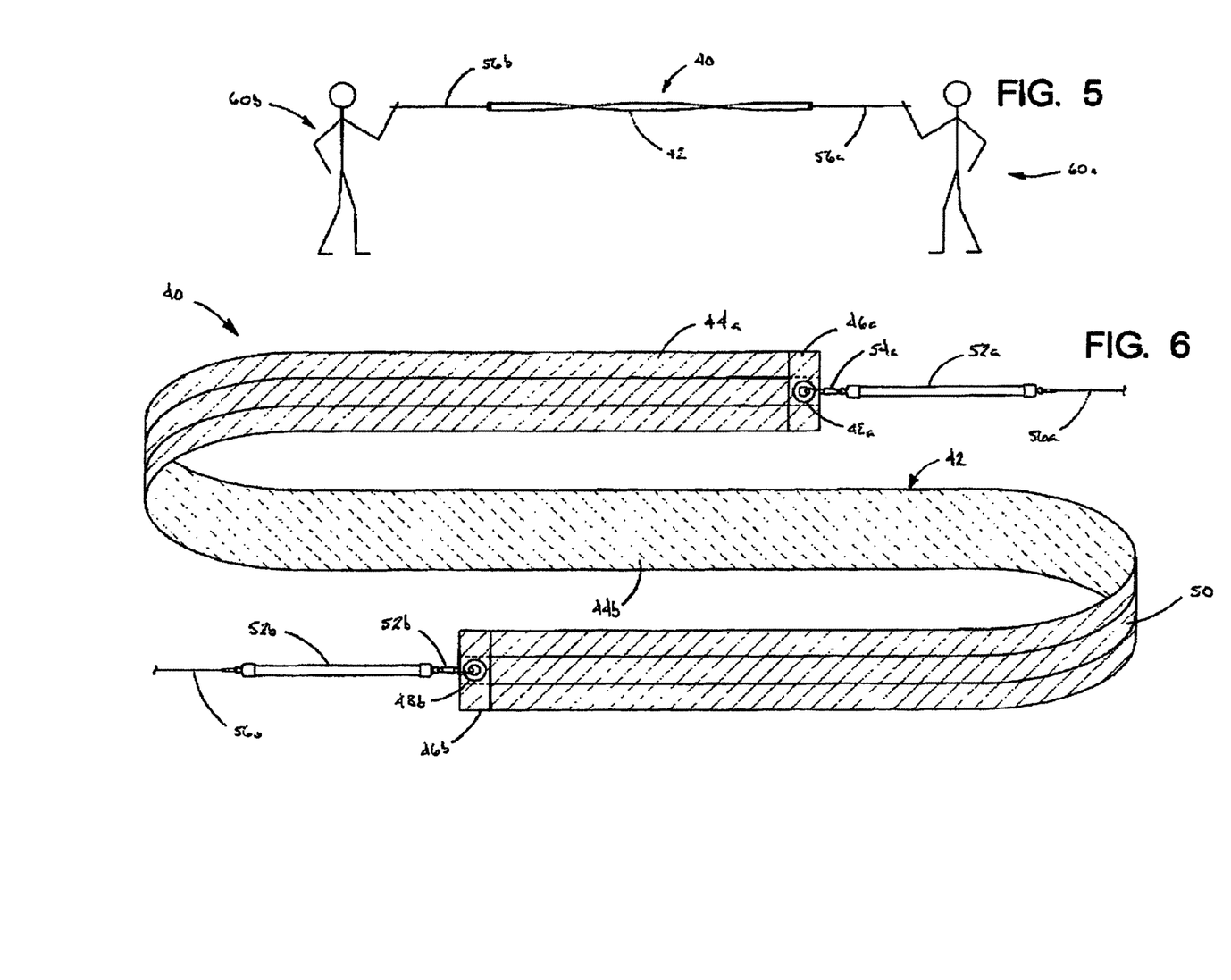
FIG. 5 is an elevational, environmental view of an apparatus in accordance with a second embodiment of the present invention, showing the manner in which this is extended to provide an elongate visual display.
FIG. 6 is an enlarged elevational view of the display apparatus of FIG. 5, showing the configuration of the strip and resilient members thereof in greater detail.

As illustrated in FIG. 6, signaling assembly 40 includes a single, elongate reflective strip member 42. Similar to the embodiment already described, this is suitably formed of metalized Mylar, with contrasting colors (e.g., red and silver) on its opposite sides 44a, 44b; however, the length of the strip is much greater, with a length of 8 feet being eminently suitable. Similar to the embodiment already described, enforcing strips 46a, 46b are folded over the ends of Mylar strip member 42, which provides support for grommets 48a, 48b that form attachment openings. In addition, a longitudinal reinforcement strip 50 runs the length of the Mylar strip and is attached to the grommets and reinforcement strips at the ends, so as to reinforce the Mylar against longitudinal loads. The reinforcement strips 46a, 46b, and 50 are suitably formed of fiberglass tape having a color (e.g, red) that preferably matches that of the side of the Mylar strip to which it is mounted. The fiberglass tape is mounted to the Mylar by adhesion or other suitable means.

First and second elastomeric cords 52a, 52b are mounted to the ends of the elongate reflective strip 42 by swivel members 54a, 54b that attach to the grommets 48a, 48b. The elastomeric members are suitably formed of short lengths of stretchable ("bungee") cord, surgical tubing, with conventional connectors at the ends, or the like, while the swivel members may suitably be, for example, conventional metal swivels of the type commonly employed-in fishing gear.

Figure 7:
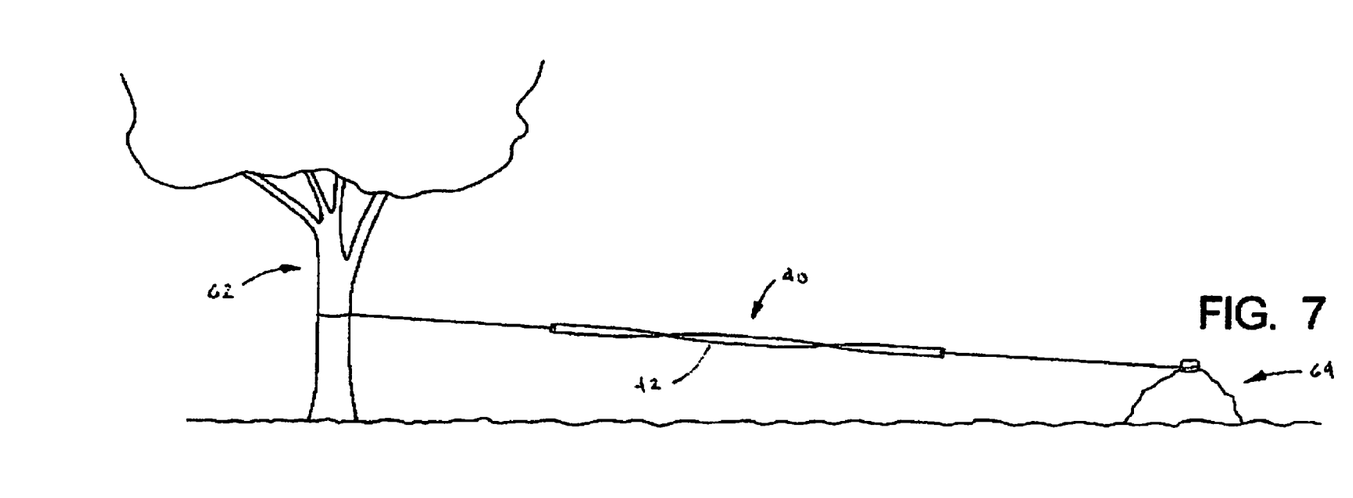
FIGS. 7-10 are elevational environmental views showing various manners in which the display apparatus of FIGS. 5-6 can be deployed, namely, by attachment of a single strip between a tree and rock or other stationary object, by tensioning the strip between two individuals in a raft, by having a plurality of strips on a ropes between two trees or other stationary objects, and suspending the strips from the branches of a tree or similar object.
Figure 8:
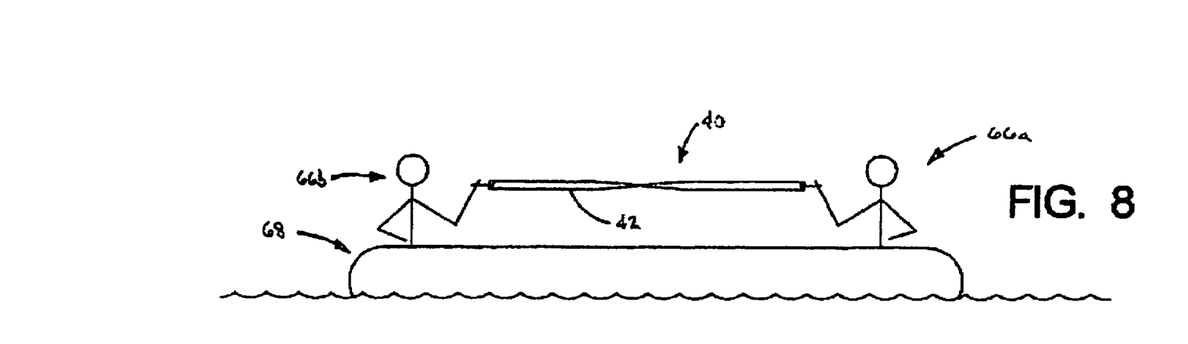

Cords 56a, 56b are attached to the opposite ends of the elastomeric members 52a, 52b, i.e., the ends opposite the swivels/grommets. The lines may simply be formed of lightweight cordage, such as parachute cord, for example, and allow the reflective strip member 42 to be stretched taut between two objects. For example, the cords may be held by two persons 60a, 60b and stretched taut as shown in FIG. 5. Similarly, reflective assembly 40 may be stretched between two fixed objects, such as a tree and rock 62, 64 as shown in FIG. 7, or between two persons 66a, 66b in a raft 68, as shown in FIG. 8. These are, of course, only a few examples of the many ways the ends of the cords can be attached to spaced-apart objects.

With the assembly 40 held taut in an exposed location, as shown in FIGS. 5 and 7-8, even slight air movement will cause the reflective strip member 42 to rotate and twist between the two elastomeric members 52a, 52b, by virtue of the broad, flat surfaces of the strip that are exposed to the wind; in even a moderate breeze, the twisting and turning action becomes very rapid and pronounced. As a result, the reflected light produces a rapidly flashing almost strobe like effect that quickly catches the eye, even at comparatively long distances.

Elastomeric members (52a, 52b) allow the assembly to be drawn taut without overtensioning reflective strip 42, both avoiding damage to the strip and allowing it to turn/twist freely as described above. It will be understood that some embodiments may include only a single elastomeric member, rather than the two that are shown in FIG. 6. Moreover, in some embodiments a swivel may be provided at only one end of the strip the elastomeric member maybe fixed directly to the opposite end, so that the strip tends to "wind up" (in a manner similar to a rubber band powered airplane) while the wind is blowing and then unwinds when it slackens, so that the reflective strip member twists and turns more or less constantly under gusty or intermittent wind conditions.

Figure 9:
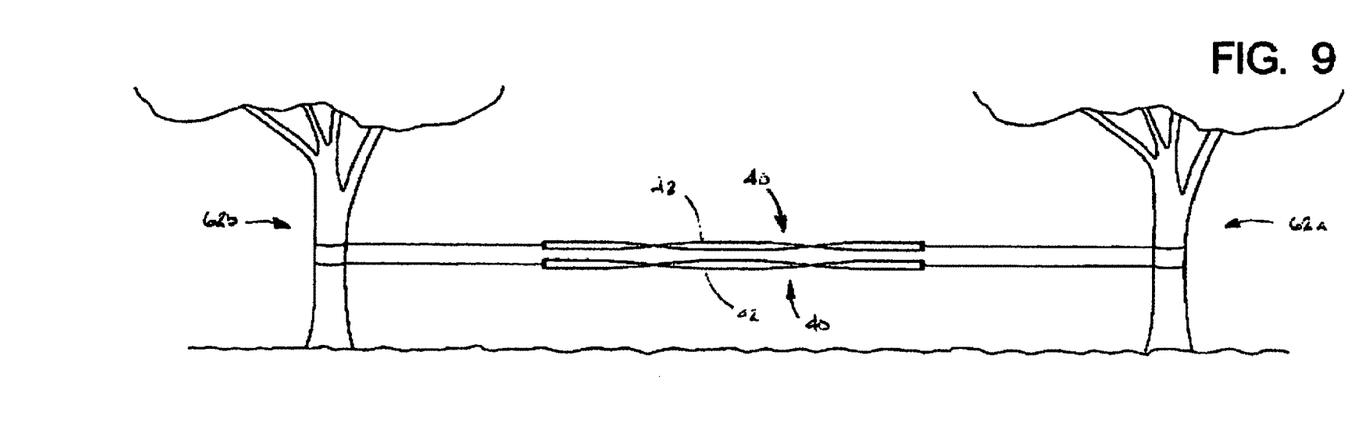
Figure 10:
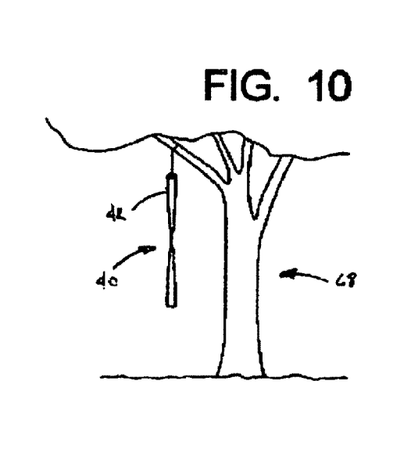
Figure 11:
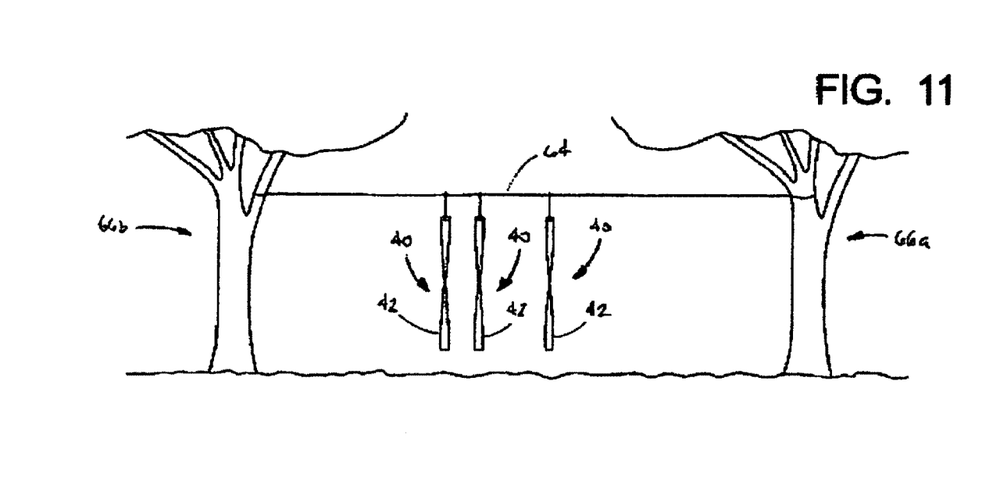
FIG. 11 is an elevational environmental view showing how multiple strips may be hung from a suspended strip.

FIGS. 9-11 illustrate other ways in which the signaling apparatus 40 can be mounted and displayed in a field environment. FIG. 9 shows the manner in which a plurality of devices may be tensioned between two trees 62a, 62b or other objects, with reflective strip members 42 running closely parallel to one another; this has the effect of combining the visual display of the reflective strips so that they are even more easily spotted. Similarly, FIG. 11 shows the manner in which a plurality of devices can again be mounted with strips 42: running parallel and adjacent to one another, in this instance by suspending them from a rope 64 or other line that is strung between two trees 66a, 66b or other objects. FIG. 10, in turn, shows an arrangement in which the attachment cord at one end can be tied to a limb of a tree 68 so that strip 42 is suspended therefrom. A great many other arrangements are, of course, possible; it will be understood however, that in general those arrangements in which strips are held in a tensioned relationship between two objects will provide a more consistent display that is less likely to become disarranged and tangled than those instances where the strips are merely suspended.

Figure 12:
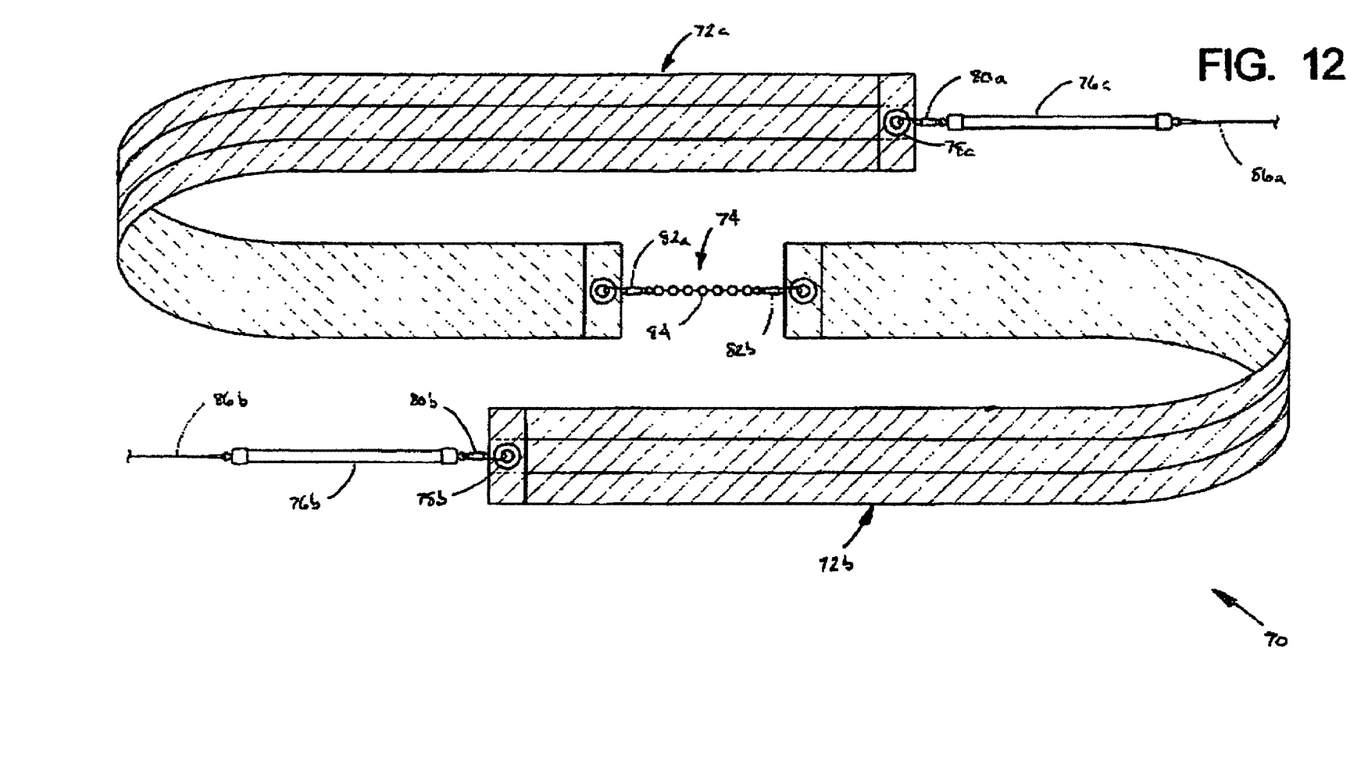
FIG. 12 is an elevational view, similar to FIG. 6, showing the manner in which two of the strip members may be connected end-to-end by a swivel member, so as to form an articulated display assembly in which the strip members are individually rotatable.

FIG. 12 shows an apparatus 70 in accordance with another embodiment of the invention, in which the reflective portion is made up of two strip members 72a, 72b that are joined end-to-end by a connector member 74. The strip members are substantially identical in construction to the strip member 42 described above, although they may be somewhat shorter (e.g., about 4 feet in length). Similarly, elastomeric members 76a, 76b are attached to grommets 78a, 78b, at the distal ends of the strips by swivels 80a, 80b in the same manner as already described. The central pivot connection 74, in turn, is suitably formed of swivels 82a, 82b interconnected by a short length of ball swivel chain 84. Accordingly, the two strip members 72a, 72b, which are preferably of approximately equal length, are free to rotate independently of one another even though they are commonly tensioned between two sets of elastomeric members 76a, 76b and attachment cords 86a, 86b.

Figures 13, 14:
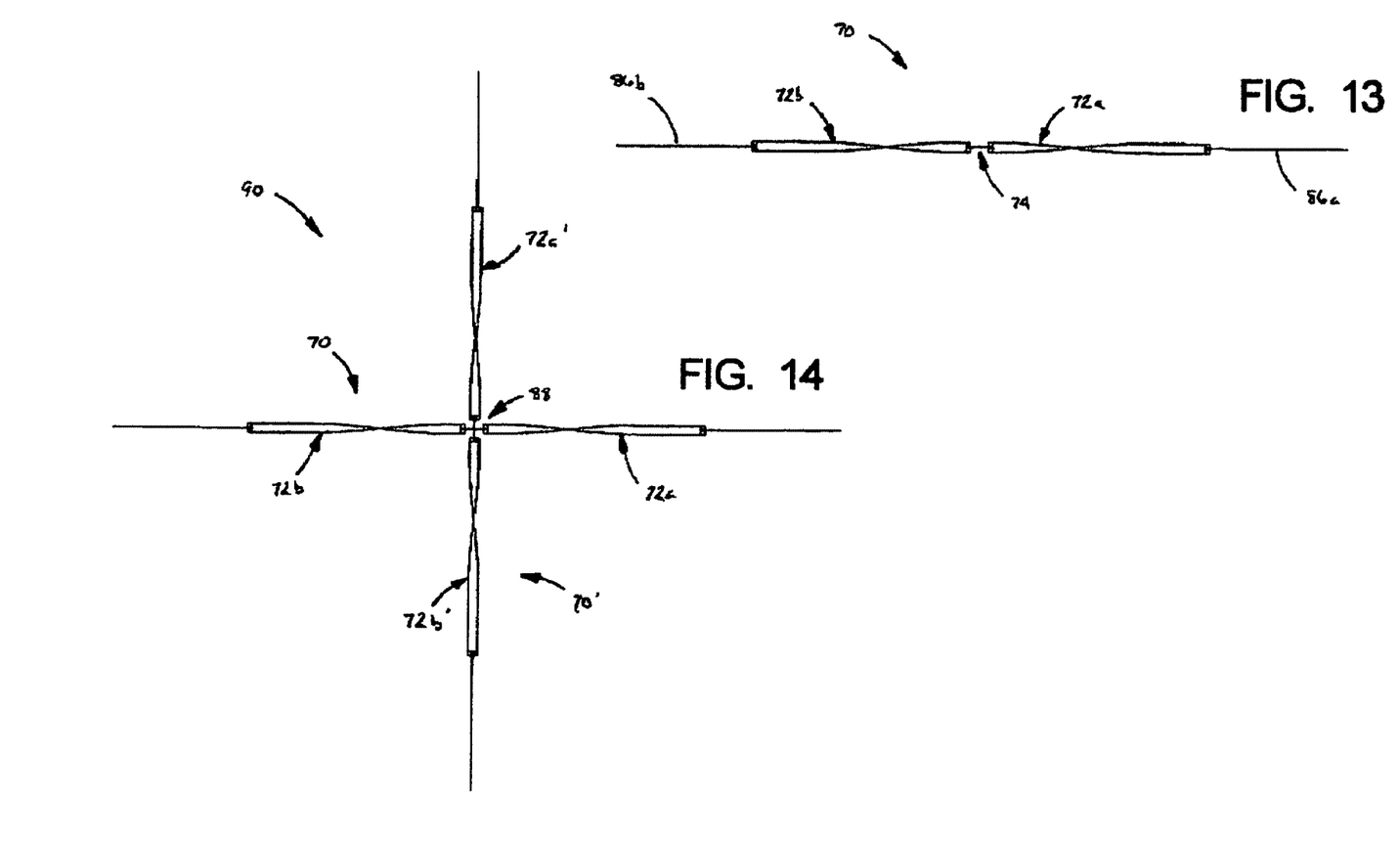
FIG. 13 is an elevational view of the articulated display assembly of FIG. 12, showing the configuration of the assembly when deployed.
FIG. 14 is an elevational view, similar to FIG. 13, showing two of the articulated display assemblies arranged in a cross pattern to form a recognized distress signal.

FIG. 13 illustrates a single device 70 can be tensioned between two objects or otherwise displayed in a straight line, in essentially the same manner as described above, but with each of the strip members 72a, 72b twisting/rotating independently. Furthermore, as can be seen in FIG. 14, two of the assemblies 70, 70' can be arranged at right angles to one another with the connector chains 74 twisted together, to form an "X" Pattern, that is (as noted above) an established distress signal; in this configuration, each of the reflective strip member 72a, 72b and 72a', 72b' will continue to-rotate freely, even though the two assemblies are interconnected at the middle.

Figure 15:
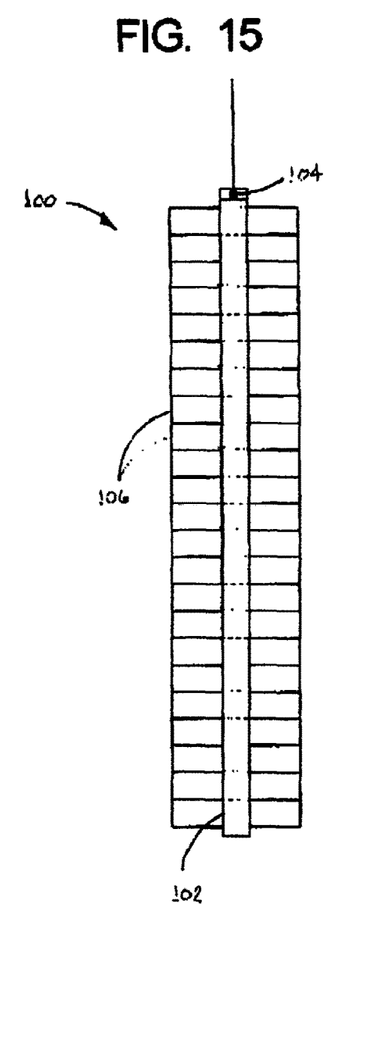
FIG. 15 is a partial, elevational view of a reflective member in accordance with another embodiment of the present invention, in which the reflective member includes a main, longitudinally extending strip for bearing tension loads and a multiplicity of short, laterally extending reflective strips for increasing the reflective area of the member.
Figure 16:
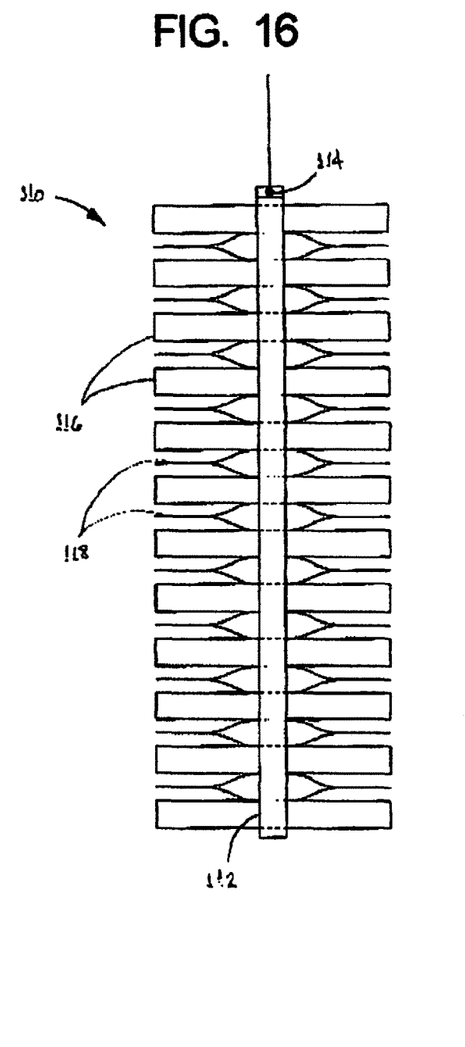
FIG. 16 is a partial elevational view of a reflective member of another embodiment of the present invention, similar to FIG. 15, in which each transversely extending strip is twisted 90 degrees, so as to increase the angles from which the reflection of the member may be visible to an observer.

FIGS. 15-16 show additional configurations of the reflective strip members that may be used in the apparatus described above. Each is subdivided into a series of extending strip portions provide a larger and more active visual signal, albeit at the cost of being somewhat less compact when in rolled up form.

As illustrated in FIG. 15, reflective strip member 100 includes longitudinally extending reinforcement strip 102 having grommets 104 that form attachments eyes at its end (one end only being shown in FIG. 15), similar to the reinforcement strip described above with reference to FIG. 6. The reflective, metalized Mylar material, in turn, is formed into a plurality of transversely extending strips 106 that are mounted to reinforcing strip 102, so that the strips extend on both sides thereof in substantially edge-to-edge relationship. The distal ends of the strips 106 are therefore free to move and "flutter independently of one another while the tension is borne by the reinforcing strip 102. The added width and independent movement created by the transversely extending strips tends to produce a reflective pattern that is more active and visible at different angles under certain conditions.

The reflective member 110 that is shown in FIG. 16 is generally similar to that of FIG. 15, in having a plurality of transversely extending strips that are mounted to a longitudinally extending reinforcing strips 112 having grommets 114 that form attachment eyes at the ends. In this instance, however, they alternate between flat strip portions 116 that lie in the main plane of the reflective member; as defined by reinforcing strip 112 and twisted strip members 118 having distal ends that are permanently turned to extend generally perpendicular to the main plane. As with the reflective member described in FIG. 15, all of the strip portions 116, 118 are free to flex and flutter in wind with the twisted portions 118 providing an additional reflected pattern that is more visible from directions in line with the reflective member i.e., when looking at it along its length rather than from the side.

As already described, the preferred metalized Mylar material that forms the reflective strips provides a radar return that can be detected by radar equipped search craft. To further enhance the radar signature, additional materials may be adhered to or embedded in the strips, such as bits of aluminum foil, for example.

Furthermore, as was also noted above, under certain circumstances, notably military operations, it is desirable that the visual pattern be visible only to friendly forces and not to others, or at least not to the naked eye. This can be achieved with the present invention by, for example, forming the strip member with an infrared luminescent capability, or with a self-heating capability, so that the signal is only visible to personnel having IR detection gear. The strips may also be configured to only be visible in the IR rather than visible light range.

It is to be recognized that various alterations, modifications, and/or additions may be introduced into the constructions and arrangements of parts described above without departing from the spirit or ambit of the present invention as defined by the appended claims.

For example, building upon the above description, strips of metalized Mylar material can be adopted for use on small watercraft, such as kayaks, or boats. The strips might be secured to a side of a watercraft, or suspended from a pole extending in a vertical position for use with the strips. Also, the strips might be fitted with floats, to insure that the strips remain on the surface of the body of water in which the watercraft is located, thus providing an effective signaling device. Moreover, such use can be used to create a radar signature for the watercraft, which is especially important for kayaks and the like in low visibility situations where larger vessels might overrun the smaller, less visible watercraft.

Another example of how the teachings of the present invention can be incorporated into other constructions involves devices that activate during sudden physical contact, such as a plane crash or a vehicle driving off the side of a road down into a canyon. In such scenarios a compact device can be fitted to the aircraft or vehicle, or several such devices can be used, which are triggered by sudden impact. Thus, for example, the device can have a spring-loaded or explosive device (e.g., carbon dioxide cartridge) that shoots strips of metalized Mylar material into the air upon impact. The strips can also include weights, such as three pronged fish hooks or the like, to help catch the strips in vegetation after the device is activated. In such an embodiment, the emergency activation upon impact will create a signal that can be seen by radar, so it will be easier to locate the downed plane or vehicle.

Accordingly, it will be readily apparent to those skilled in the art, armed with the present disclosure, that many additional applications and modifications may be made to the present disclosure. Also, it is also readily apparent that the present disclosure advances unique methods and devices for creating radar signatures in situations where the person or persons creating the radar signatures want to be located. In this regard, while the present disclosure has focused on using strips of materials, because they are compact, inexpensive and easy to deploy; the key to creating a radar signature is creating large numbers of sharp edges to reflect the radar, and the teachings described herein can be used to create thousands of such sharp edges with relative ease.

The concepts and devices described so far can be used to create products useful for safety and rescue functions in a variety of scenarios, and such products can be specifically designed for use in different environments For example, for persons who are hiking or traveling by foot in wilderness areas, a compact signaling device kit can be designed which includes a carrying case and a single reflective strip rolled up with one stretchable member, such as a short bungee cord, and additional line which can be used to tie the stretchable member between two suitable attachment points. As weight is often a concern for persons traveling in wilderness areas, the components of such a kit can be designed so as to achieve the desired goal of a rescue signaling device which is lightweight and compact.

Figure 17:
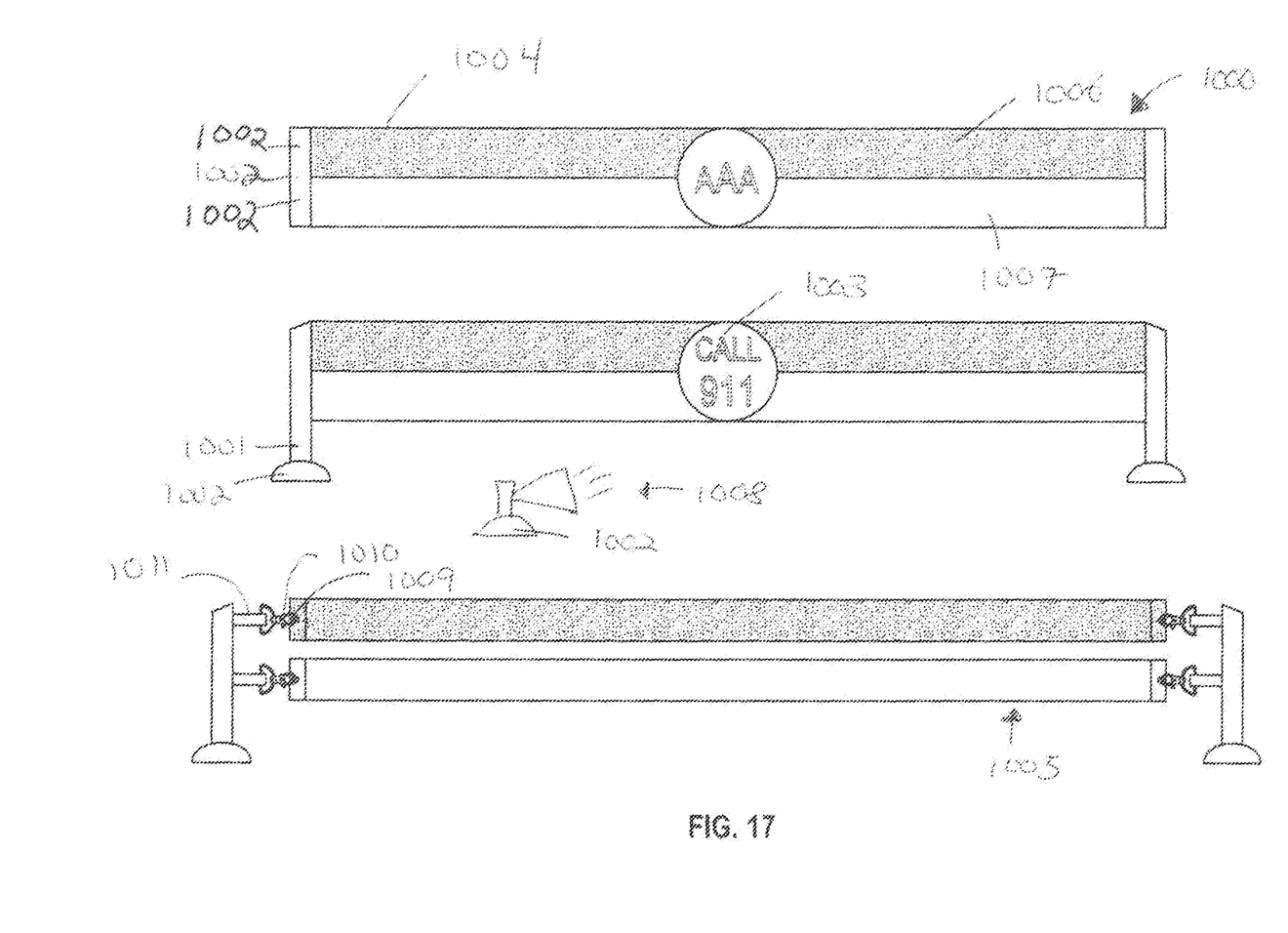
Figure 18:
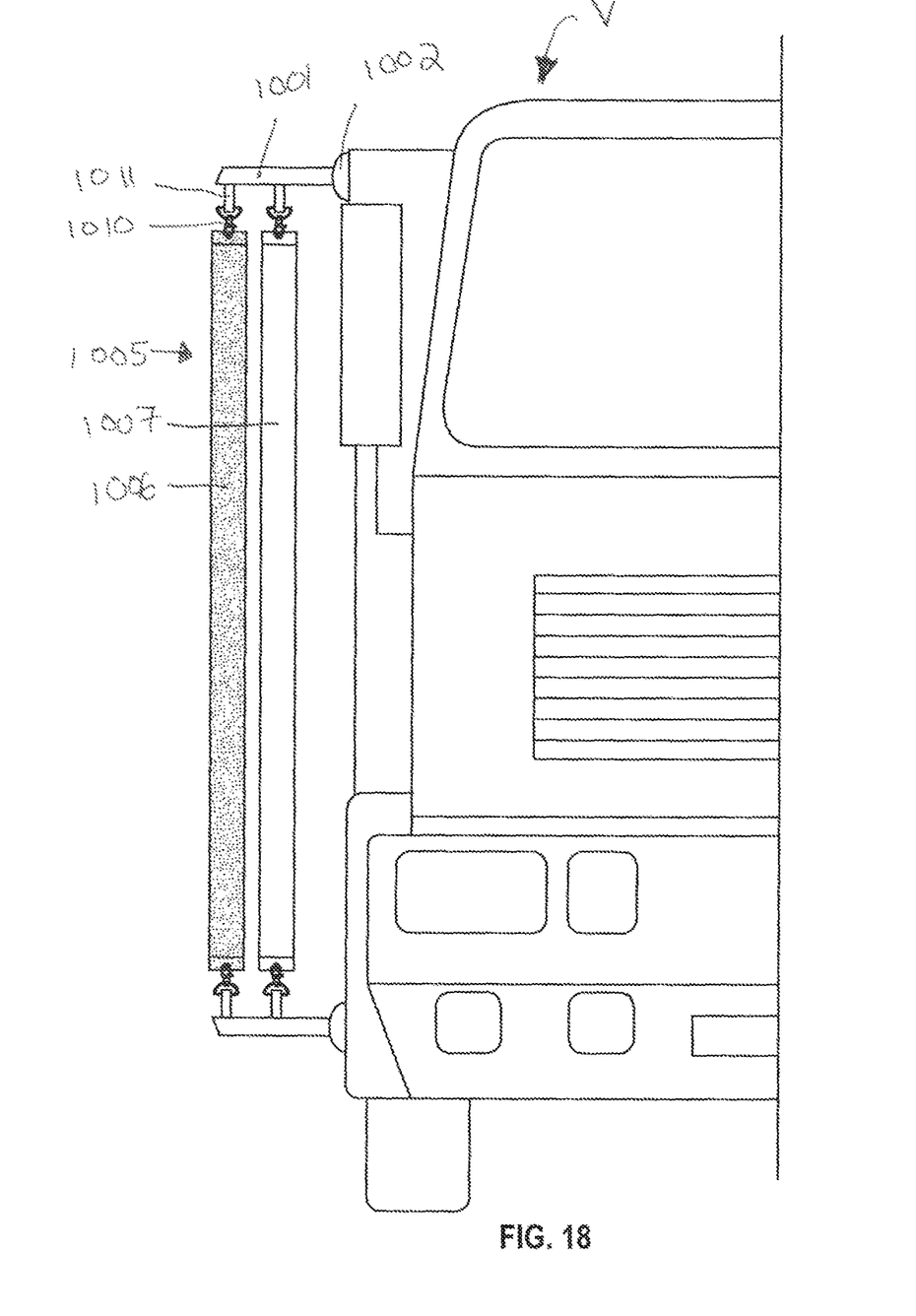
FIG. 18 illustrates use of such a kit on a side of a vehicle exposed to passing traffic.

When weight and compact size are not so critical, a signaling kit can include larger components, and additional components, designed for anticipated use of the kit. For example, another use of such a kit is a roadside signaling device that can be used to signal oncoming traffic of a vehicle that has been pulled off of a road, examples of which are illustrated in FIG. 17, which can be placed on back of a car mounted for emergency break downs on highways. For such use, at least one signaling strip, and preferably two or more signaling strips 1000, may be mounted to supports 1001 which can be affixed to the vehicle by any suitable means, one example of which is magnet. 1002. The signaling strips might simply be held taught, and can include a notification 1003 such as Call 911, and either one large signaling strip 1004, or two signaling strips 1005, can combine multiple colors, especially red 1006 and silver 1007, to make a visually recognizable signaling display. In addition, one or more strobes 1008 can be directed to the at least one signaling strip to create a more recognizable visual display, and such strobe(s) can also be mounted to supports which can be affixed to the vehicle by any suitable means, such as a magnet 1002. In especially preferred embodiments, the signaling strip or strips are preferably fitted with swivel or twist connections 1010, a grommet 1009 and a bungie 1011, so that the strip(s) can twist and thereby expose both the front and back surfaces of the signaling strip to a viewer of the signaling strip; in such configuration, as was illustrated in FIG. 4, an elongate reinforcing strip 1101 can be folded over the ends of signaling strip 1004, so that grommets 1009 create first and second attachment points in first and second ends of signaling strip 1004. As is illustrated in FIG. 17, two end supports can be attached to a vehicle by magnets with one or more signaling strips suspended and held taut between the end supports. When such a signaling device is mounted on a vehicle that is pulled off a road, for example, the signaling device can be used to alert vehicular traffic which is coming from behind or toward the vehicle. Also, a strobe can optionally be mounted to one or both of the end supports, or separately mounted on the vehicle or elsewhere, and directed toward the one or more signaling strips, to make such the reflective strip(s) visible from a great distance at night, without the need for such strip(s) to be illuminated by an approaching vehicle. Moreover, the same type of signaling kit can be used in watercraft, and fixed mounts, not attached by magnets, can also be built into, or retrofitted to, such watercraft. It is also especially desirable that such a signaling kit be adapted to mount on a side of a vehicle V, as is illustrated in FIG. 18, so that wind draft caused by passing vehicles will cause one or more reflective strips to spin as such vehicles pass.

Figure 19:
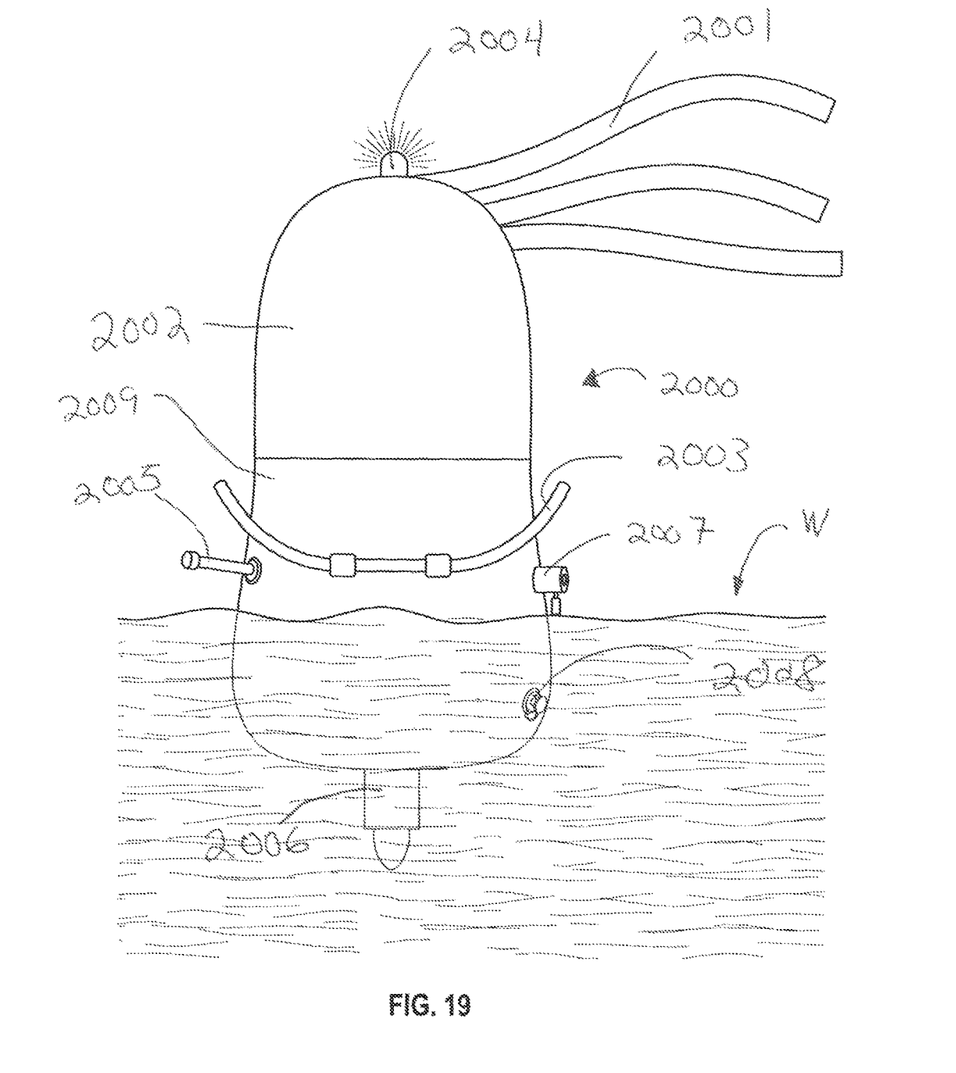
FIG. 19 illustrates a buoy-type of signaling device which provides an emergency signal in accordance with the present invention.

While a signaling kit in accordance with the present invention can save lives in emergency situations when used with watercraft, another use of such a kit is for situations where a person falls overboard from a watercraft. In such a scenario, an inflatable or buoyant device 2000 fitted with a signaling kit can not only provide an important signaling function, but also provide safety flotation for the person(s) found overboard. In one especially preferred embodiment of such a device, an inflatable cartridge 2007 (such as a Halkey Roberts auto inflate with a carbon dioxide cartridge) can be triggered when the device comes into contact with water, by having the water release a triggering device (e.g., by having a safety stop of the triggering device dissolve when exposed to water), thereby inflating the device, which then elevates one or more reflective strips 2001 from a body of water W to make them visible from a distance (and it is especially preferred that such strips be held taught between two attachment points in accordance with the teachings already described, but such strips might also hang loose, similar to the strips depicted in FIG. 1). It is also especially preferred that the portion of the buoyant device which extends out of the water is covered with a reflective coating 2002, such as Mylar, which may also have reflective materials added to it to make it more visible to radar, as has already been described, and that a lower portion 2009 have a visible color such as international orange. FIG. 19 illustrates one embodiment of such a device, which also includes a rope 2003 for a person lost overboard to cling to, as well as a strobe light 2004 that might be manually actuated or automatically actuated by inflation of the device, contact with water, or some other means. It is also especially preferred that the buoyant device include a mechanism for inflating the buoyant device by a person's mouth 2005, similar to a life vest or buoyancy device, and also include a stabilizer 2006 to help keep the buoyant device in an upright position. The buoyant device can also have a flood valve 2008 so that it can be partially filled with water to create a sea anchor. Finally, a buoyancy device in accordance with the principles already described might be designed so that it can be quickly thrown from a watercraft to a person who has fallen overboard, or it can also be designed as a life vest, or incorporated into a life vest or other wearable device, so that it is readily available to a person falling overboard.

In still another embodiment of a signaling kit in accordance with the present invention, a signaling kit includes an inflatable object, such as a balloon, which can be inflated and is tethered to an anchor point, which might be affixed to a point on land or to a buoy-device or watercraft located on a body of water, and then one or more reflective strips can be suspended between the inflatable object and the fixation point for the inflatable object, and, in an especially preferred embodiment, the inflatable object itself can be coated with Mylar and possible radar enhancing chaff. Such an inflatable device can be incorporated as an additional feature into the devices just described for use with watercraft.

The foregoing detailed description is illustrative of the invention and it is to be understood that additional embodiments thereof will be obvious to those skilled in the art. This description, together with those additional embodiments obvious to those skilled in the art, are considered to be within the scope of the invention.

What is claimed is:

1. A portable signaling assembly comprising:
   a composite strip with a broad and flat profile, said composite strip comprising:
      an elongate reflective strip formed of a metalized film having a first planar surface and a second planar surface opposed the first planar surface, said elongate strip having a first end configured with a first attachment mechanism and a second end opposite the first end configured with a second attachment mechanism;
      a first attachment point configured in the first end;
      a second attachment point configured in the second end; and
      an elongate reinforcing strip longitudinally affixed to the elongate reflective strip configured so as to reinforce the elongate reflective strip against longitudinal loads;
   a first swivel member attached to the first attachment point;
   a second swivel member attached to the second attachment point;
   a first stretchable member attached to the first swivel member; and
   a second stretchable member attached to the second swivel member;
   wherein the portable signaling assembly is configured so that when the composite strip is held taut in air by the first and second stretchable members the composite strip freely twists and rotates along a line formed between the first and second attachment points when a breeze contacts the broad and flat profile to create a visual signaling display as a result of twisting and rotation of the elongated reflective strip in which the elongated reflected strip is twisted at least once through one hundred and eighty degrees so that the first planar surface and the second planar surface are visible from a single vantage point.

2. The portable signaling assembly of claim 1 wherein the first planar surface has a first color and the second planar surface has a second color, and the first color and the second color are contrasting colors.

3. The portable signaling assembly of claim 2 wherein the first color is silver and the second color is red.

4. The portable signaling assembly of claim 1 further comprising means for attaching the composite strip to a motor.

5. The portable signaling assembly of claim 1 further comprising means for attaching the composite strip to a watercraft.

6. A kit for a portable signaling assembly, comprising:
   a composite strip with a broad and flat profile, said composite strip comprising:
      an elongate reflective strip formed of a metalized film having a first planar surface and a second planar surface opposed the first planar surface, said elongate strip having a first end configured with a first attachment point configured in the first end and a second attachment point configured in the second end; and
      an elongate reinforcing strip longitudinally affixed to the elongate reflective strip configured so as to reinforce the elongate reflective strip against longitudinal loads;
   a first swivel member configured to attach to the first attachment point;
   a second swivel member attached to the second attachment point; and
   a first stretchable member configured to attach to the first swivel member;
   wherein the portable signaling assembly is configured so that when the composite strip is held taut in air by the first stretchable member the composite strip freely twists and rotates along a line formed between the first and second attachment points when a breeze contacts the broad and flat profile to create a visual signaling display as a result of twisting and rotation of the elongated reflective strip in which the elongated reflected strip is twisted at least once through one hundred and eighty degrees so that the first planar surface and the second planar surface are visible from a single vantage point.

7. The kit of claim 6 wherein the first planar surface has a first color and the second planar surface has a second color, and the first color and the second color are contrasting colors.

8. The kit of claim 7, further comprising a plurality of supports for mounting the portable signaling assembly to a vehicle.

9. A portable signaling assembly comprising:
   an elongate reinforcement strip configured with a first attachment point at a first end and a second attachment point at a second end;
   a first swivel member attached to the first attachment point;
   a second swivel member attached to the second attachment point;
   a first stretchable member attached to the first swivel member; and
   a reflective strip attached to the elongate reinforcement strip, wherein the reflective strip is formed of a metalized film with a broad and flat profile having a first planar surface and a second planar surface opposed the first planar surface, wherein the first planar surface has a first color and the second planar surface has a second color, and the first color and the second color are contrasting colors;
   wherein the portable signaling assembly is configured so that when the elongate reinforcement strip is held taut in air by the first stretchable member the elongate reinforcement strip is configured to bear a longitudinal load between the first and second attachment points and the reflective strip freely twists and rotates along a line formed between the first and second attachment points when a breeze contacts the broad and flat profile to create a visual signaling display as a result of twisting and rotation of the elongate reinforcement strip which is twisted at least once through one hundred and eighty degrees so that the first planar surface and the second planar surface are visible from a single vantage point.

10. The portable signaling assembly of claim 9 wherein the visual signaling display is created by rotation of the elongate reinforcement strip at least once through one hundred and eighty degrees in a first rotational direction followed by rotation of the elongate reinforcement strip at least once through one hundred and eighty degrees in a second rotational direction opposite the first rotational direction.

* * * * *